US006647062B2

United States Patent
Mackinnon

(10) Patent No.: US 6,647,062 B2
(45) Date of Patent: Nov. 11, 2003

(54) METHOD AND APPARATUS FOR DETECTING MOTION AND ABSENCE OF MOTION BETWEEN ODD AND EVEN VIDEO FIELDS

(75) Inventor: Andrew Stuart Mackinnon, North York (CA)

(73) Assignee: Genesis Microchip Inc., Ontario (CA)

( * ) Notice: Subject to any disclaimer, the term of this patent is extended or adjusted under 35 U.S.C. 154(b) by 452 days.

(21) Appl. No.: 09/741,825

(22) Filed: Dec. 22, 2000

(65) Prior Publication Data

US 2002/0109790 A1 Aug. 15, 2002

Related U.S. Application Data

(63) Continuation-in-part of application No. 09/734,745, filed on Dec. 13, 2000.

(51) Int. Cl.[7] .................................................. H04N 7/12
(52) U.S. Cl. ............... 375/240.16; 348/700; 348/426.1; 348/431.1
(58) Field of Search ........................ 375/240.16, 240.26; 348/699–700, 425.1, 425.3, 426.1, 431.1, 446, 451–452

(56) References Cited

U.S. PATENT DOCUMENTS

| | | | |
|---|---|---|---|
| 4,982,280 A | | 1/1991 | Lyon et al. |
| 4,998,287 A | | 3/1991 | Katznelson et al. .......... 382/34 |
| 5,291,280 A | | 3/1994 | Faroudja et al. |
| 5,317,398 A | * | 5/1994 | Casavant et al. ........... 348/570 |
| 5,394,196 A | * | 2/1995 | Robert ....................... 348/699 |
| 5,398,071 A | * | 3/1995 | Gove et al. ................ 348/558 |
| 5,521,644 A | * | 5/1996 | Sezan et al. ............... 348/452 |
| 5,563,651 A | * | 10/1996 | Christopher et al. .......... 348/97 |
| 5,689,301 A | | 11/1997 | Christopher et al. |
| 6,014,182 A | | 1/2000 | Swartz |
| 6,130,723 A | * | 10/2000 | Medin ....................... 348/607 |
| 6,157,412 A | * | 12/2000 | Westerman et al. ......... 348/558 |
| 6,545,719 B1 | * | 4/2003 | Topper ...................... 348/448 |
| 6,563,550 B1 | * | 5/2003 | Kahn et al. ................ 348/700 |
| 2002/0149703 A1 | * | 10/2002 | Adams et al. .............. 348/700 |
| 2003/0052996 A1 | * | 3/2003 | Thompson et al. ......... 348/448 |

FOREIGN PATENT DOCUMENTS

EP          0690617 A2 *   1/1996   ............ H04N/5/44

OTHER PUBLICATIONS

Delogne et al., "Conversion from interlaced to progressive formats by means of motion compensation based techniques", IEEE International Conference on Image Processing and its Applications, pp. 409–412, Apr. 1992.*
Sugiyama et al., "A method of de-interlacing with motion compensated interpolation", IEEE Transactions on Consumer Electronics, vol. 45, Iss. 3, pp. 611–616, Aug. 1999.*
U.S. patent application Ser. No. 09/734,745, Selby, filed Dec. 13, 2000.

* cited by examiner

Primary Examiner—Vu Le
(74) Attorney, Agent, or Firm—Staas & Halsey LLP

(57) ABSTRACT

A method and apparatus are provided whereby the motion between two video fields of opposite parity may be measured so as to discriminate between the presence of motion and lack thereof. The level of motion at a specified position is determined by comparing a first motion value derived from successive fields of opposite parity with a second motion value derived from successive fields of the same parity at the spatial location corresponding to that used to generate the first motion value. This determination is made with one field being common to the first and second motion values, and taking the minimum of the first and second motion values to be the motion value at that position.

5 Claims, 14 Drawing Sheets

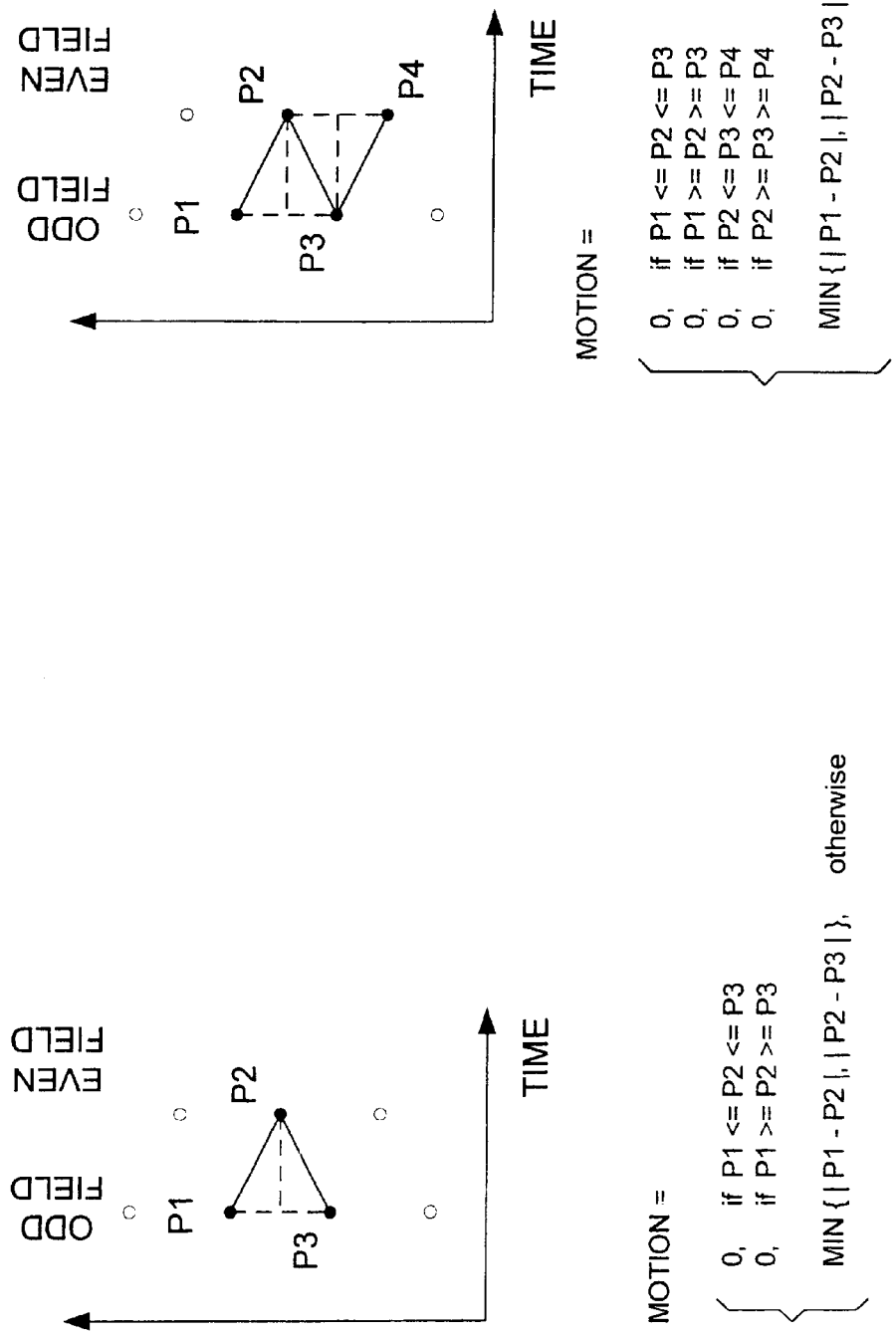

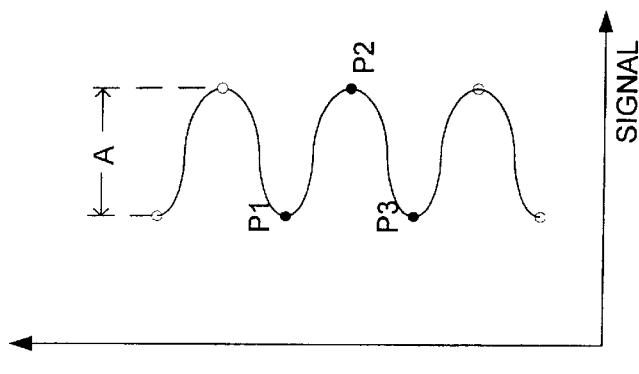
FIG. 3A (PRIOR ART)
FIG. 3B (PRIOR ART)

(COPENDING PATENT APPLICATION)

(COPENDING PATENT APPLICATION)

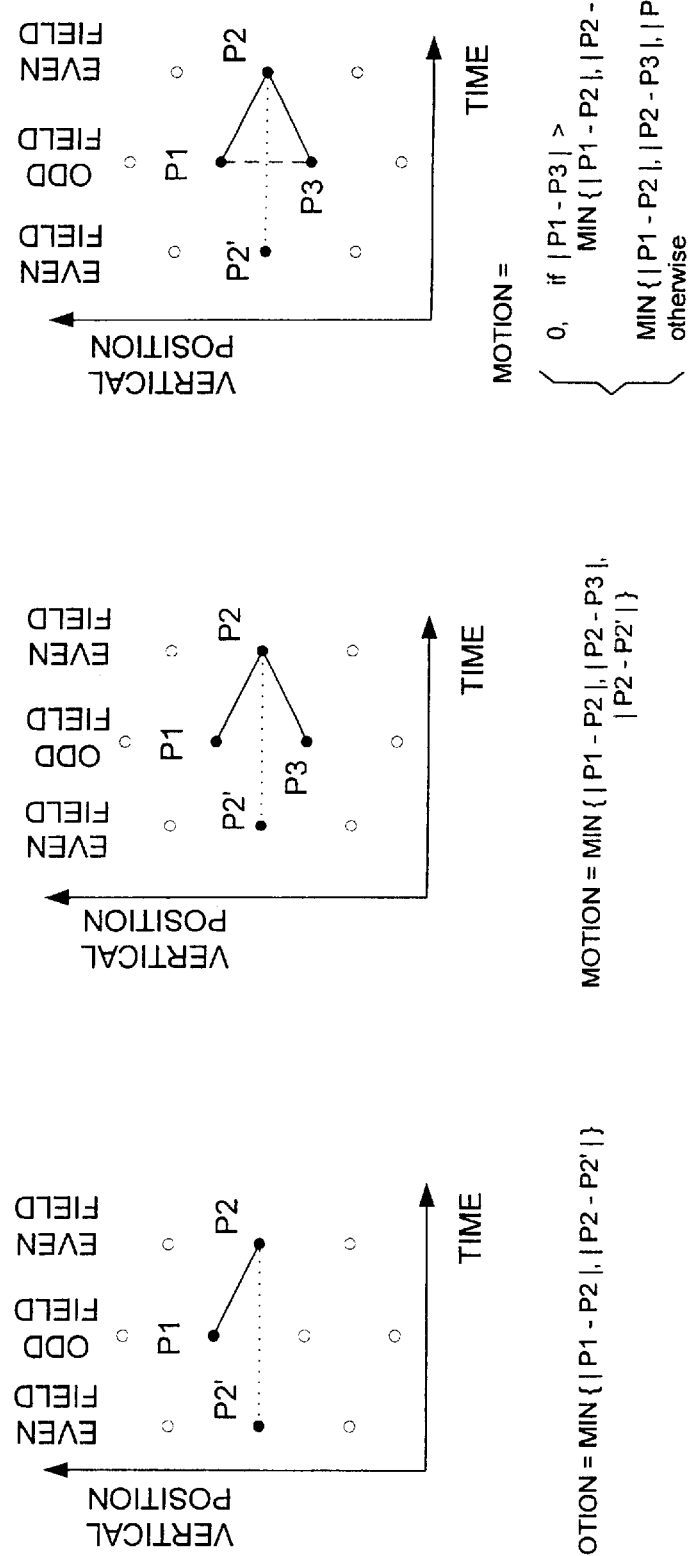

US 6,647,062 B2

METHOD AND APPARATUS FOR DETECTING MOTION AND ABSENCE OF MOTION BETWEEN ODD AND EVEN VIDEO FIELDS

CROSS REFERENCE TO RELATED APPLICATION

This is a continuation-in-part of U.S. patent application Ser. No. 09/734,745, filed on Dec. 13, 2000, entitled METHOD AND APPARATUS FOR DETECTING MOTION BETWEEN ODD AND EVEN VIDEO FIELDS, the contents of which are incorporated herein by reference.

FIELD OF THE INVENTION

This invention relates in general to digital video signal processing and more particularly to a method and apparatus whereby motion between odd and even video fields may be reliably measured despite the presence of high vertical spatial frequencies.

BACKGROUND OF THE INVENTION

The NTSC and PAL video standards are in widespread use throughout the world today. Both of these standards make use of interlacing in order to maximize the vertical refresh rate thereby reducing wide area flicker, while minimizing the bandwidth required for transmission. With an interlaced video format, half of the lines that make up a picture are displayed during one vertical period (i.e. the even field), while the other half are displayed during the next vertical period (i.e. the odd field) and are positioned halfway between the lines displayed during the first period. While this technique has the benefits described above, the use of interlacing can also lead to the appearance of artifacts such as line flicker and visible line structure.

It is well known in the prior art that the appearance of an interlaced image can be improved by converting it to non-interlaced (progressive) format and displaying it as such. Moreover, many newer display technologies, for example Liquid Crystal Displays (LCDs), are non-interlaced by nature, therefore conversion from interlaced to progressive format is necessary before an image can be displayed at all.

Numerous methods have been proposed for converting an interlaced video signal to progressive format. For example, linear methods have been used, where pixels in the progressive output image are generated as a linear combination of spatially and/or temporally neighbouring pixels from the interlaced input sequence. Although this approach may produce acceptable results under certain conditions, the performance generally represents a trade off between vertical spatial resolution and motion artifacts. Instead of accepting a compromise, it is possible to optimize performance by employing a method that is capable of adapting to the type of source material. For instance, it is well known that conversion from interlaced to progressive format can be accomplished with high quality for sources that originate from motion picture film or from computer graphics (CG). Such sources are inherently progressive in nature, but are transmitted in interlaced format in accordance with existing video standards. For example, motion picture film created at 24 frames per second is converted to interlaced video at 60 fields per second using a process known as 3:2 pull down, where 3 fields are derived from one frame and 2 are derived from the next, so as to provide the correct conversion ratio. Similarly, a computer graphics sequence created at 30 frames per second is converted to interlaced video at 60 fields per second using a pull down ratio of 2:2, where 2 fields are derived from each CG frame. By recognizing that a video sequence originates from a progressive source, it is possible for a format converter to reconstruct the sequence in progressive format exactly as it was before its conversion to interlaced format.

Unfortunately, video transmission formats do not include explicit information about the type of source material being carried, such as whether the material was derived from a progressive source. Thus, in order for a video processing device to exploit the progressive nature of film or CG sources, it is first necessary to determine whether the material originates from a progressive source. If it is determined that the material originates from such a source, it is furthermore necessary to determine precisely which video fields originate from which source frames. Such determination can be made by measuring the motion between successive fields of an input video sequence.

It is common to measure at least two different modes of motion in determining the presence of a film source. Firstly, it is common to measure the motion between a given video field and that which preceded it by two fields. In this case, motion can be measured as the absolute difference between two pixels at the same spatial position in the two fields. A measure of the total difference between the two fields can be generated by summing the absolute differences at the pixel level over the entire field. The quality of the motion signal developed in this way is fairly high, since the two fields being compared have the same parity (both odd or both even) and therefore corresponding samples from each field have the same position within the image. Thus, any difference that is measured between two pixels will largely be the result of motion. Although the quality of measurement made in this way is high, unfortunately it is of limited value. For an input sequence derived from film in accordance with a 3:2 pull down ratio, only one out of five successive measurements made in this way will differ significantly from the rest. The measure of motion between the first and third fields of the three fields that are derived from the same motion picture frame will be substantially lower than the measurements obtained during the other four fields, since the two fields being compared are essentially the same and differ only in their noise content. This does not provide sufficient information to avoid artifacts under certain conditions when a film sequence is interrupted. Also, in the case of an input sequence derived from film or CG in accordance with a 2:2 pull down ratio, no useful information is provided whatsoever.

A second mode of motion that can be measured is the motion between successive fields which are of opposite parity (one odd and one even). Although this mode of measurement overcomes the limitations of the above, it is inherently a more difficult measurement to make since a spatial offset exists between fields that are of opposite parity. Thus, even if there is no actual motion, a finite difference between the fields may exist owing to the spatial offset. This tends to increase the measured difference when there is no motion making it more difficult to reliably discriminate between when there is motion and when there is not. This is particularly true in the presence of noise and/or limited motion. A number of methods have been proposed in the prior art for the measurement of motion between fields of opposite parity. It is an objective of the present invention to provide a method for the measurement of motion between fields of opposite parity with greater ability to discriminate between the presence of motion or lack thereof than those of the prior art.

The following patents are relevant as prior art relative to the present invention:

| U.S. Pat. No. Documents | | |
| --- | --- | --- |
| 5,689,301 - Christopher | Nov 18/97 | Method and apparatus for identifying video fields produced by film sources |
| 6,014,182 - Swartz | Jan 11/00 | Film source video detection |
| 4,982,280 - Lyon | Jan 1/91 | Motion sequence pattern detector for video |
| 5,291,280 - Faroudja | Mar 1/94 | Motion detection between even and odd fields within 2:1 interlaced television standard |

SUMMARY OF THE INVENTION

According to the present invention, a method and apparatus are provided whereby the motion between two fields of opposite parity may be measured with greater ability to discriminate between the presence of motion and lack thereof than with those techniques of the prior art. According to the present invention, the level of motion at a specific position is determined by comparing some motion value M1 derived from successive fields of opposite parity with another motion value M2 derived from successive fields of the same parity at the spatial location corresponding to that used to generate M1, with the further restriction that one field is common to M1 and M2, and taking the minimum of M1 and M2 to be the motion value at that position.

This technique has the benefit that false detection of motion arising from the presence of high vertical spatial frequencies is minimized, while actual motion is still readily detected. Using this technique, false detection is completely avoided for all vertical spatial frequencies, up to and including the vertical frame Nyquist frequency. The resulting local measurement of motion is then summed over substantially an entire field in order to provide a global motion signal that is useful for determining whether an input sequence derives from a film source.

BRIEF DESCRIPTION OF THE DRAWINGS

A description of the prior art and of the preferred embodiments of the present invention is provided hereinbelow with reference to the following drawings in which:

FIG. 3 is a schematic representation showing further detail of one example of how motion may be measured between successive fields of opposite parity, according to the prior art.

DESCRIPTION OF THE PREFERRED EMBODIMENTS

Figure 1:
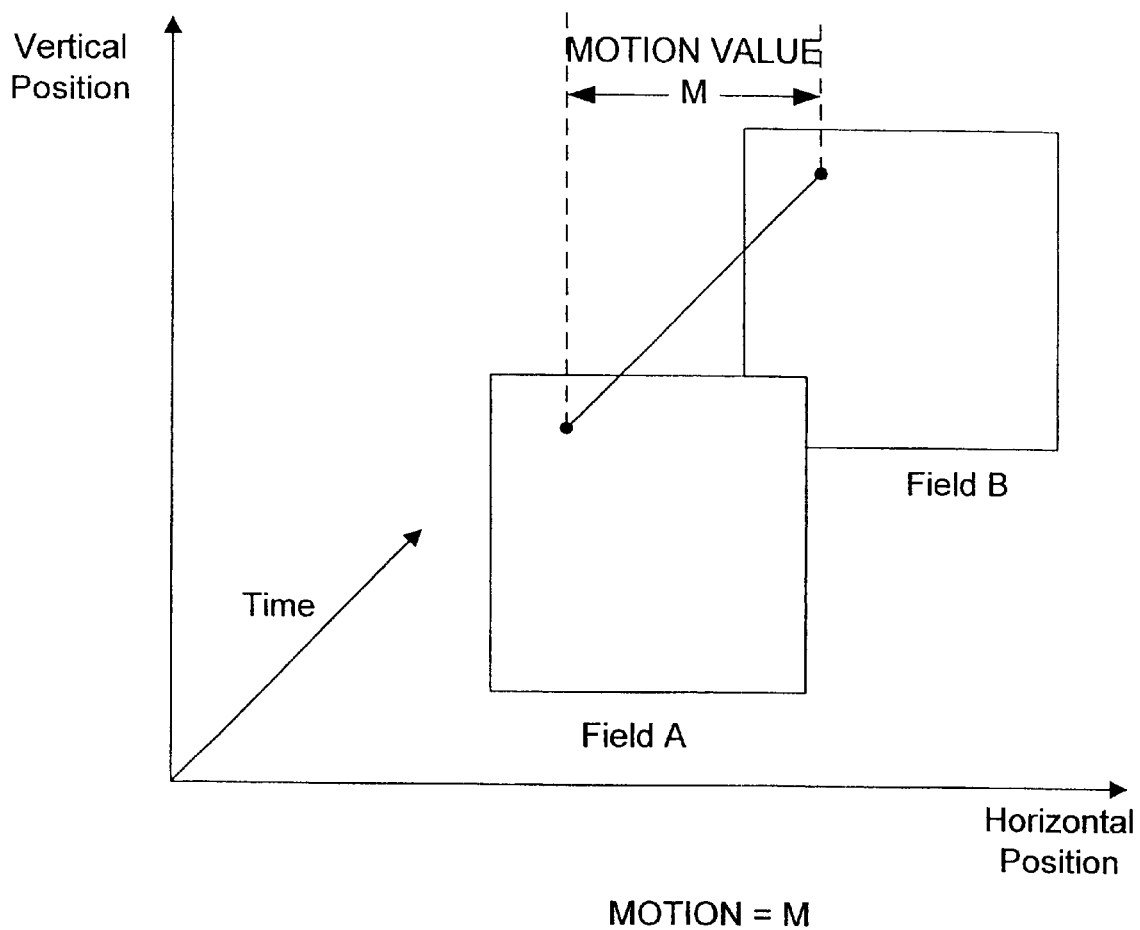
FIG. 1 is a schematic representation showing how motion may be measured between successive fields of opposite parity, according to the prior art.
Figure 2C:
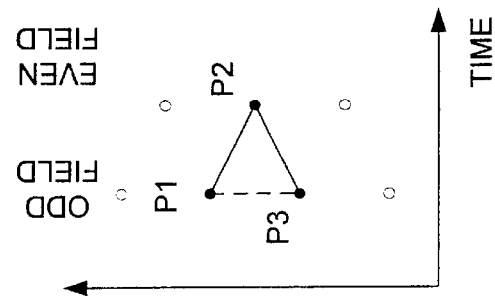
FIG. 2 is a schematic representation showing further detail of how motion may be measured between successive fields of opposite parity, according to the prior art.
Figure 2B:
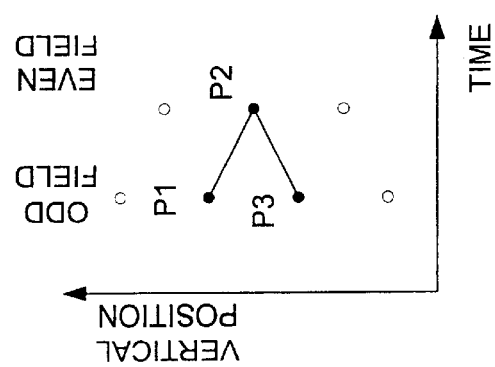
Figure 2A:
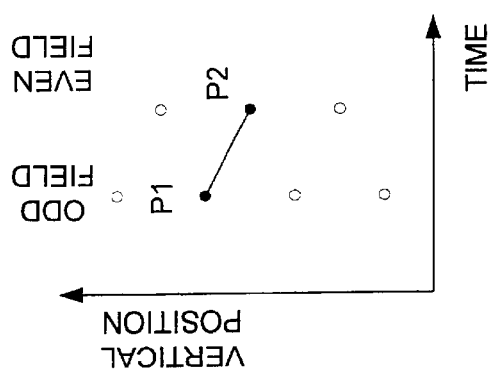

Referring now to FIG. 1, a first example is shown of how motion may be measured between successive fields of opposite parity, according to the prior art. One or more pixels of field A are compared with one or more pixels of field B having a set spatial correlation with those from field A to produce an adjacent field local motion value M. One local motion value is produced for each spatial location in the current field, field B, and substantially all of these local motion values are summed together to produce a global motion value which represents the total motion from field A to field B.

FIG. 2a through FIG. 2e show examples of adjacent field motion measurement corresponding to the general case shown in FIG. 1, as fully disclosed in the prior art and commonly owned copending patent application Ser. No. 09/734,745. As disclosed in commonly owned copending patent application Ser. No. 09/734,745, all of the two field measurements in the prior art are limited by the fact that vertical frequencies above some point are interpreted as motion even in a still image, due to the differing vertical position of pixels in fields of opposite parity.

Referring now to FIG. 3, a measurement technique is shown, as disclosed in U.S. Pat. No. 5,689,301 (Christopher). The left half of the figure shows the spatio-temporal relationship between pixels in two successive video fields while the right half shows the value of each pixel relative to its vertical position for a particular image detail. The example used is that of an image detail that has a vertical spatial frequency exactly equal to the vertical frame Nyquist frequency. The formula for calculating the motion according to this fourth method is shown at the bottom of FIG. 3. The measured motion is taken as the lesser of the absolute differences between pixels P1 and P2, and between pixels P2 and P3, unless the value of pixel P2 is between the values of pixels P1 and P3, in which case the motion value is taken as zero. Although the pixel values used in this example are intended to represent samples of an image in which there is no motion, application of this technique results in a measured motion value equal to quantity A. Thus, this technique fails to reject as motion the difference between the pixels that arises owing to their different vertical positions.

Figure 4A:
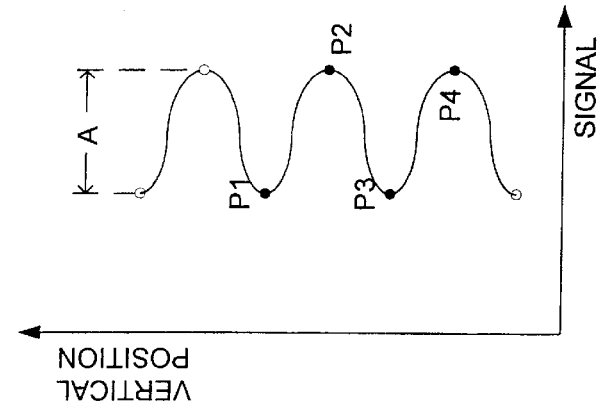
FIG. 4 is a schematic representation showing how motion may be measured between successive fields of opposite parity, according to the commonly owned copending patent application Ser. No. 09/734,745.
Figure 4B:
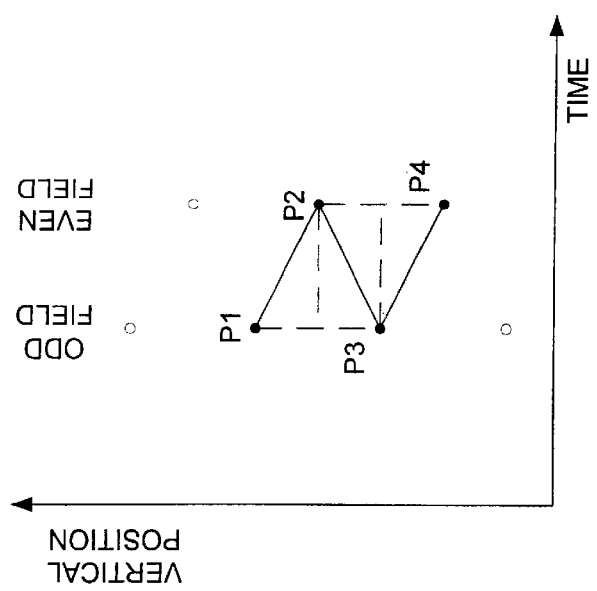

Referring now to FIG. 4, a measurement technique is shown, as fully disclosed in commonly owned copending patent application Ser. No. 09/734,745. The left half of the figure shows the spatio-temporal relationship between pixels in two successive video fields while the right half shows the value of each pixel relative to its vertical position for a particular image detail. The example used is that of an image detail that has a vertical spatial frequency exactly equal to the vertical frame Nyquist frequency. The formula for calculating the motion according to one aspect of this copending patent application is shown at the bottom of FIG. 4. The measured motion is taken as the lesser of the absolute differences between pixels P1 and P2, pixels P2 and P3, and between pixels P3 and P4, unless the value of either pixel P2 or pixel P3 is between the values of its immediate neighbours, in which case the motion value is taken as zero. Using this technique, the motion value generated in the example is equal to quantity A, since no pixel value is between that of its immediate neighbours. Thus, this technique on its own also fails to reject as motion the difference between the pixels that arises owing to their different vertical positions.

Figure 5:
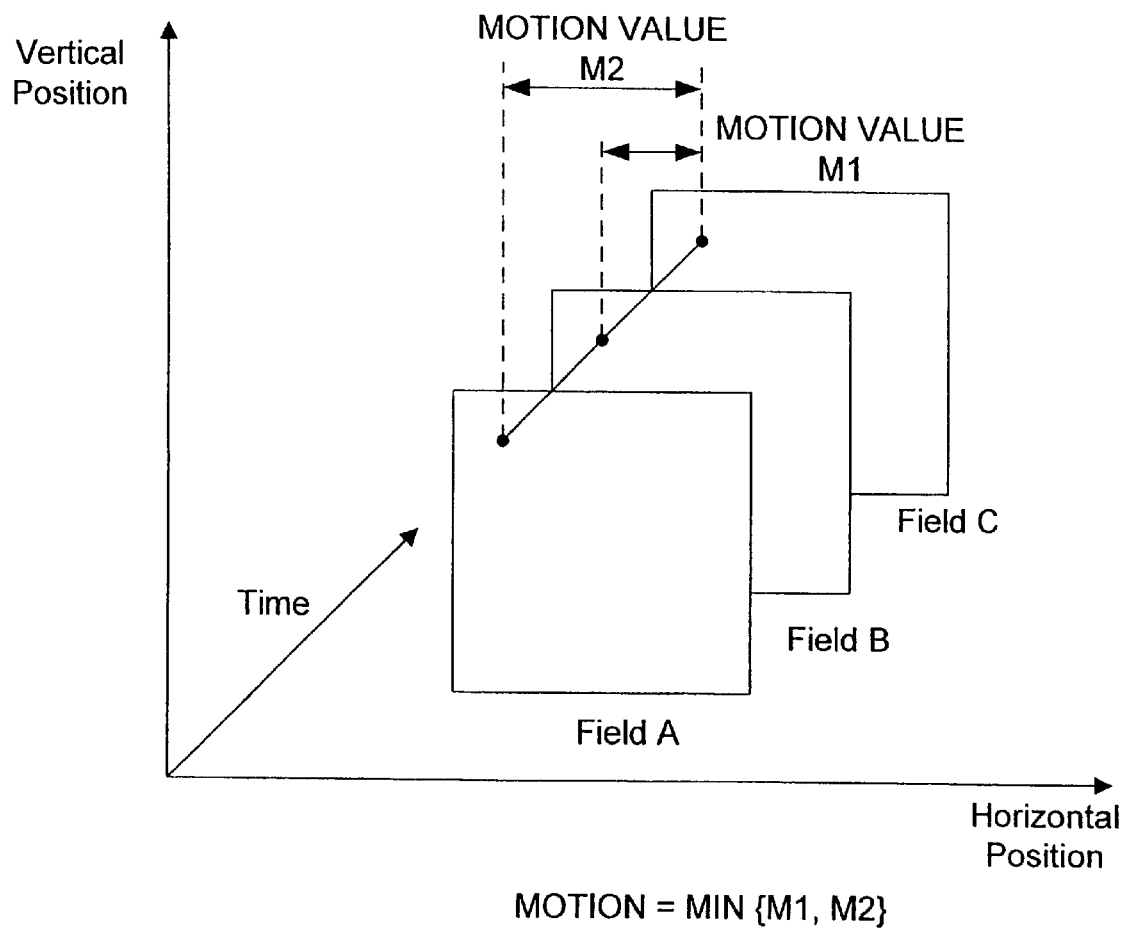
FIG. 5 is a schematic representation showing how motion may be measured by comparing motion values derived from successive fields of opposite parity and those derived from successive fields of the same parity, according to the method of the present invention.

Referring now to FIG. 5, an enhanced measurement technique is shown according to the present invention. A local motion value M1 derived from two successive fields of opposite parity, either A and B or B and C, preferably the most recent two, using one of the aforementioned adjacent field motion measurements, is compared with a local motion value M2 derived from two successive fields of the same parity, A and C. The minimum of the two motion values is taken. Example implementations according to the method of present invention are shown in FIG. 6a through FIG. 6e. These five examples use the corresponding methods shown in FIG. 2 to produce local motion value M1, while additionally producing local motion value M2 by comparing pixels P2 and P2'. The final local motion value is equal to the minimum of M1 and M2.

Figure 6E:
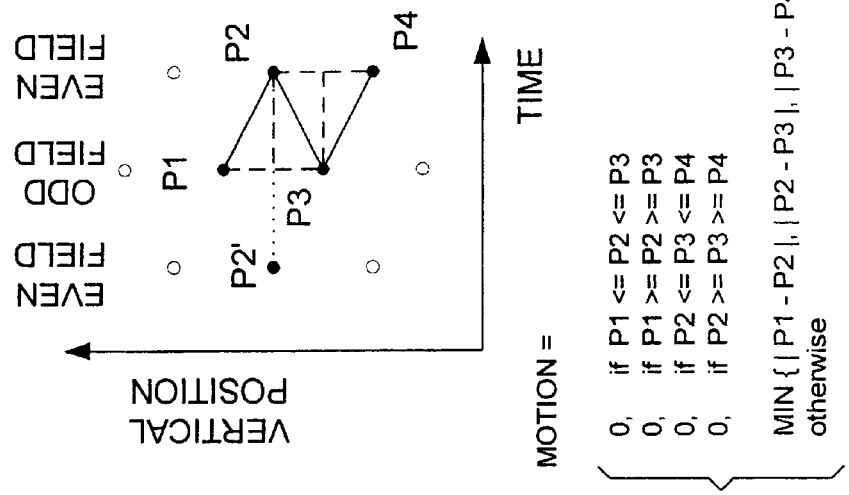
FIG. 6 is a schematic representation showing further detail of how motion may be measured by comparing motion values derived from successive fields of opposite parity and those derived from successive fields of the same parity, according to the method of the present invention.
Figure 6D:
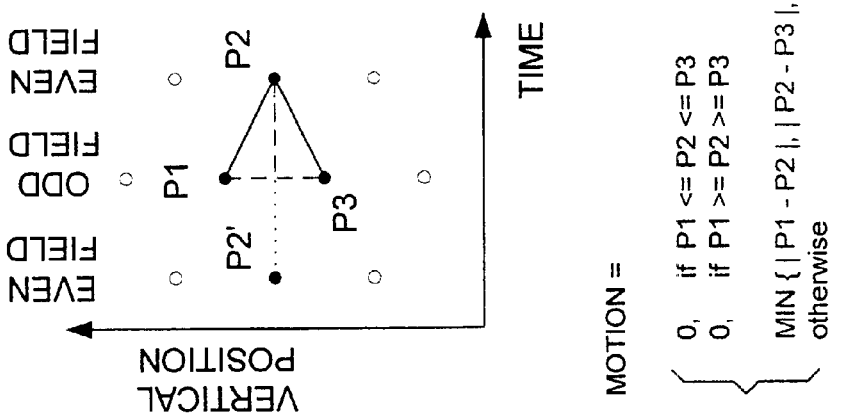
Figure 7B:
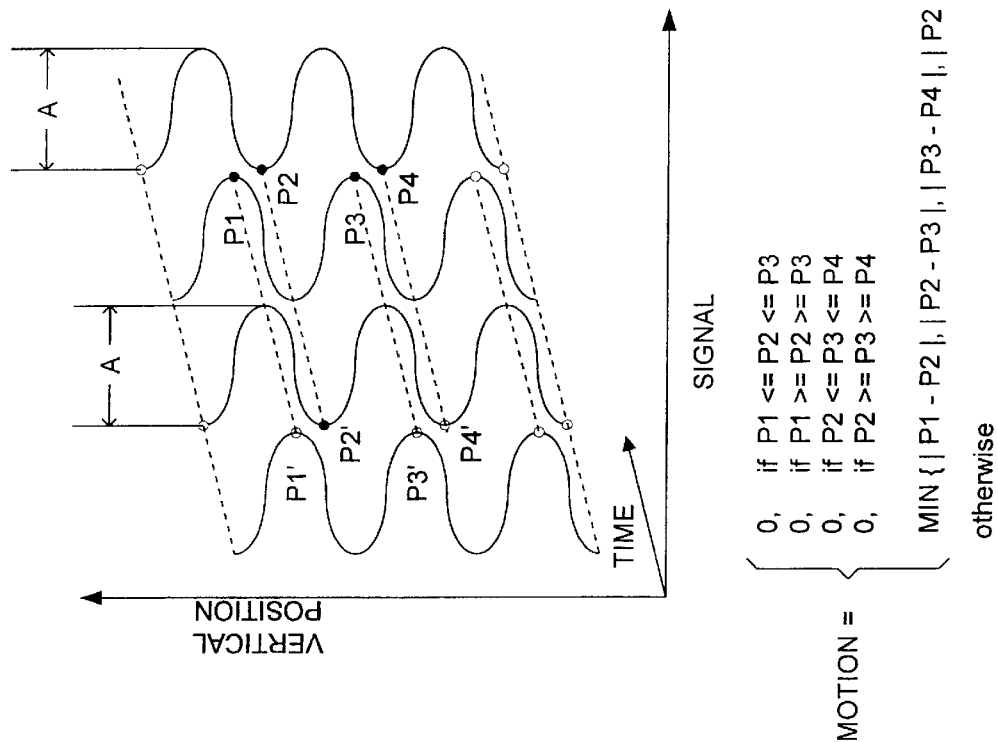
FIG. 7 is a schematic representation of a first example showing the method of the present invention using four pixel positions, where there is no motion between successive fields.
Figure 7A:
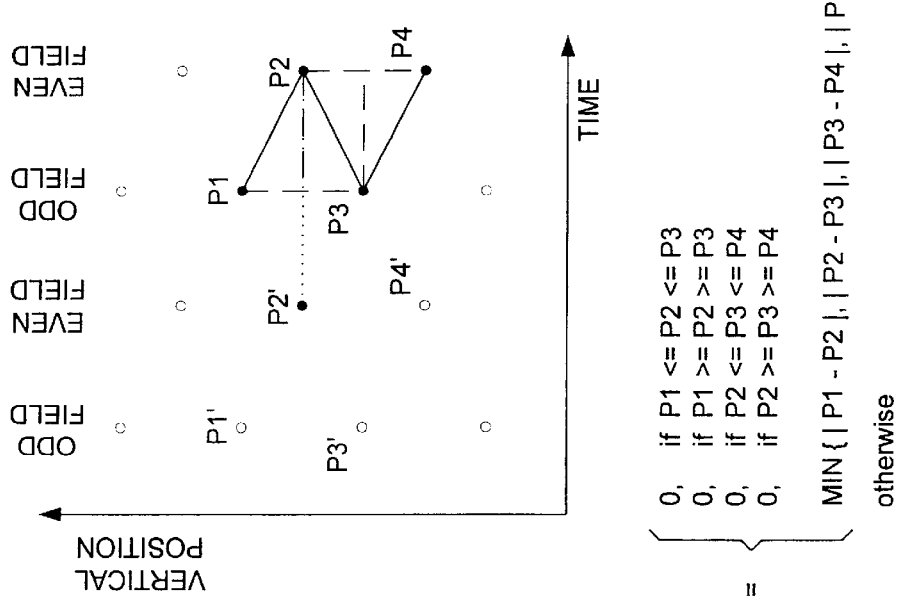

Referring now to FIG. 7, a more detailed example of the technique shown in FIG. 6e is shown according to the present invention. The left half of the figure shows the spatio-temporal relationship between pixels in four successive video fields, or two video frames. The right half shows the three dimensional representation of the value of each pixel relative to its vertical position for a particular image detail over two video frames. Since the video sequence represents a still image, the value of pixel P1 equals that of P1', P2 equals P2', P3 equals P3', and P4 equals P4'. The example used is that of an image detail that has a vertical spatial frequency exactly equal to the vertical frame Nyquist frequency. The formula for calculating the motion according to one aspect of the present invention is shown at the bottom of FIG. 7. The measured motion is taken as the lesser of the absolute differences between pixels P1 and P2, pixels P2 and P3, pixels P3 and P4, and between pixels P2 and P2' unless the value of either pixel P2 or pixel P3 is between the values of its immediate neighbours, in which case the motion value is taken as zero. Using this technique, the motion value generated in the example is zero, since P2 and P2' are equal. This is the desired result, since the pixel values in the example are intended to represent samples of an image in which there is no motion. False detection of motion is completely avoided for all vertical spatial frequencies, up to and including the vertical frame Nyquist frequency, whenever there is no motion between the three fields at the motion detection location. Although some of the prior art techniques may avoid false motion under certain conditions, none of the prior art techniques are guaranteed to avoid all false motion at up to and including the vertical frame Nyquist frequency, as provided by the present invention.

Figure 8B:
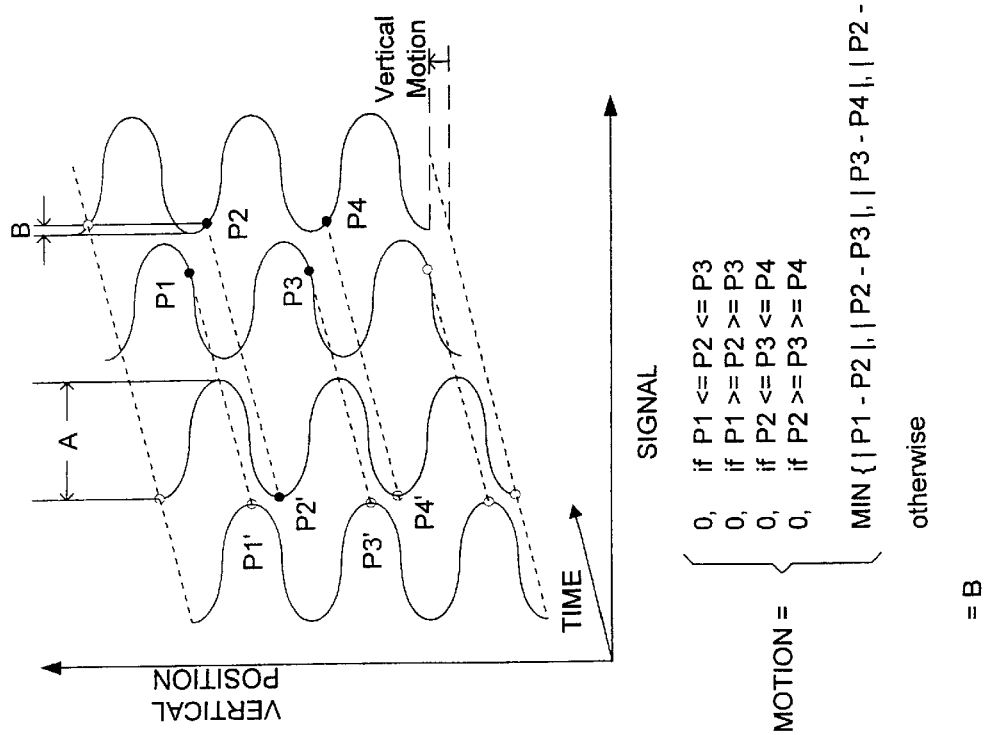
FIG. 8 is a schematic representation of a second example showing the method of the present invention using four pixel positions, where motion exists between successive fields.
Figure 8A:
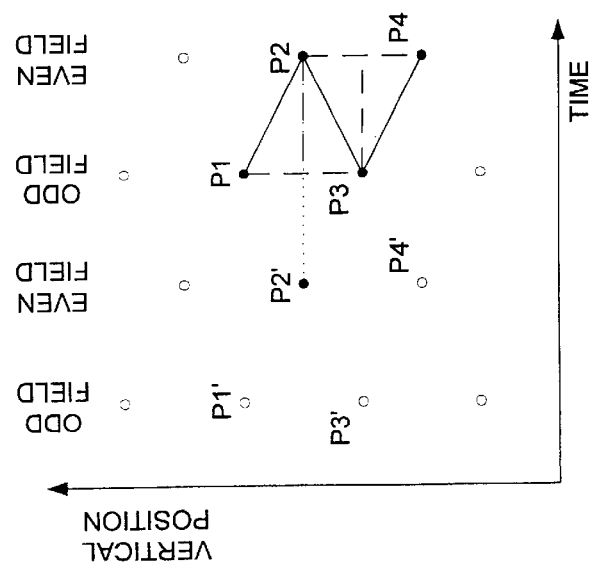

Referring now to FIG. 8, another example is provided in which the present invention is applied to an image in which motion exists. The left half of the figure shows the spatio-temporal relationship between pixels in two successive video fields while the right half shows the value of each pixel relative to its vertical position within the image. In this example, the two video fields represented by pixels P1, P2, P3, and P4 have been shifted along the vertical position axis with respect to the two video fields represented by pixels P1', P2', P3', and P4' to represent motion between the first set of two fields and the second set of two fields. Pixel values P2 and P2' now differ by quantity B. According to the method of the present invention, the motion value is given as quantity B which is the desired result since it correctly indicates the presence of motion between the fields. The use in the present invention of a minimization between motion values of adjacent fields and motion values of fields separated by one field may result in a lower measured motion value than would otherwise be obtained using a motion value based solely on the motion between adjacent fields as in the prior art methods. When summed over an entire field, this may tend to produce a slightly lower total than would otherwise be obtained. However, the present technique produces significantly lower false motion values for fields between which there is no motion. For typical video sources, the present technique results in a significantly higher ratio between the values measured where motion exists and the values measured where there is none. Hence, the ability to discriminate between motion and lack thereof is enhanced.

Figure 9:
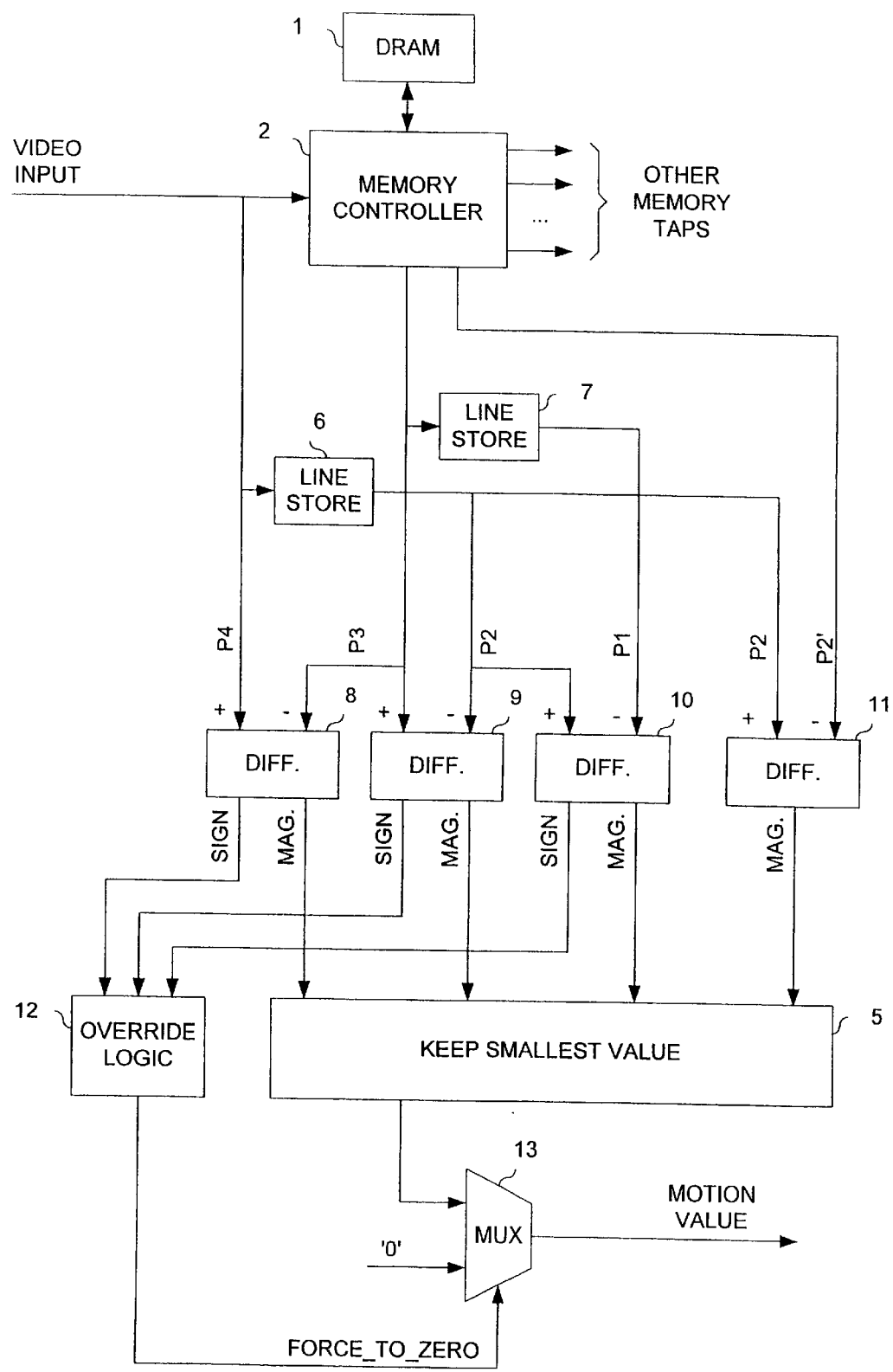
FIG. 9 is a block diagram of an apparatus for implementing the method of FIG. 7 and FIG. 8.

FIG. 9 shows an apparatus implementing a preferred embodiment of the method of the present invention as shown in FIGS. 7 and 8 where a motion value is calculated based on four pixels. An input video signal is applied to the input of a memory controller 2, a line delay element 6 and a first input of a differencing circuit 8. The pixel that is present at the video input at any given time corresponds to that designated as pixel P4 in FIGS. 7 and 8. The memory controller stores incoming video data into a DRAM array 1 and later retrieves it so as to produce a version of the input video signal that is delayed (e.g. by 263 lines in the case of an NTSC input). The memory controller 2 may also concurrently retrieve other versions of the input video signal that are delayed by different amounts to be used for other purposes that are not relevant to the present invention. The one field delayed pixel that is output from the memory controller 2 at any given time corresponds to that designated as pixel P3 in FIGS. 7 and 8, which is subsequently applied to the input of a second line delay element 7, a first input of a differencing circuit 9 and the second input of differencing circuit 8 referred to herein above. Line delay element 6 provides a version of the input video signal that is delayed by one vertical line and corresponds to pixel P2 in FIGS. 7 and 8. Pixel P2 is applied to a first input of a differencing circuit 10, the second input of differencing circuit 9 described above, and the first input of a differencing circuit 11. Line delay element 7 provides a version of the one field delayed video signal from the memory controller that is further delayed by one vertical line and corresponds to pixel P1 in FIGS. 7 and 8. Pixel P1 is applied to the second input of differencing circuit 10. The memory controller 2 provides a version of the input signal that is delayed by two fields plus one line (resulting in a total of 526 lines of delay in the case of an NTSC input signal) and corresponds to pixel P2' in FIGS. 7 and 8. Pixel P2' is applied to the second input of differencing circuit 11. Each of the differencing circuits 8–10 generates both the sign and the magnitude of the differences between their input signals, while differencing circuit 11 generates only the magnitude of the differences between its input signals. The three signals representing the signs of the differences are applied to the inputs of override logic block 12. The four signals representing the magnitudes of the differences are applied to the inputs of the keep smallest value block 5 which propagates only the smallest of the four values at its input. A multiplexor 13 selects either the output of the keep smallest value block or zero, depending on the output of override logic block 12. The value at the output of multiplexor 13 is forced to zero if the signs at the outputs of differencing circuits 8 and 9 are the same, or if the signs at the outputs of differencing circuits 9 and 10 are the same. The value at the output of multiplexor 13 provides a measure of the motion in the vicinity of pixels P1–P4 according to one aspect of the present invention. The local motion value may be integrated over a complete field in order to provide an overall measure of the motion between two fields for the purpose of determining whether the input sequence derives from a film source.

Figure 10B:
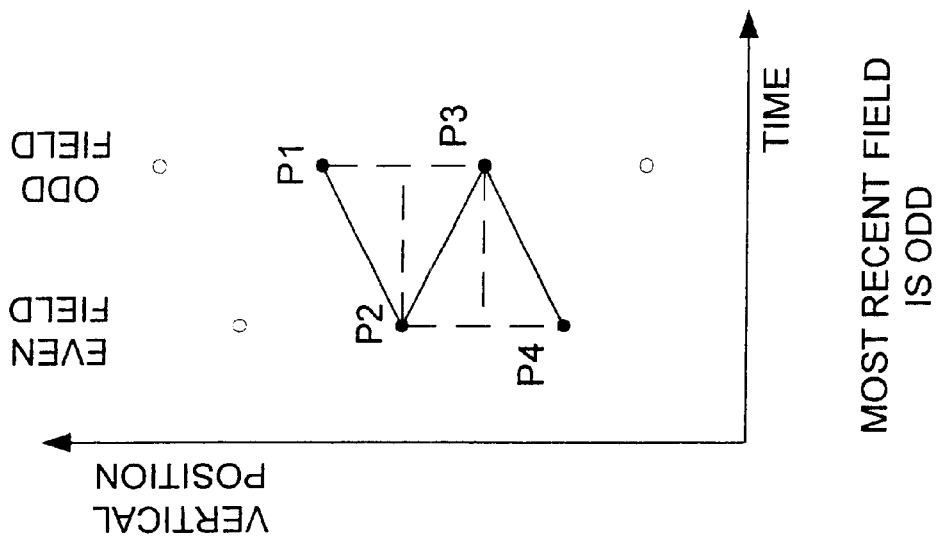
FIG. 10 is a schematic representation showing selection of contributing pixels for a preferred spatio-temporal relationship depending on whether the most recent field is even or odd, according to commonly owned copending patent application Ser. No. 09/734,745.
Figure 10A:
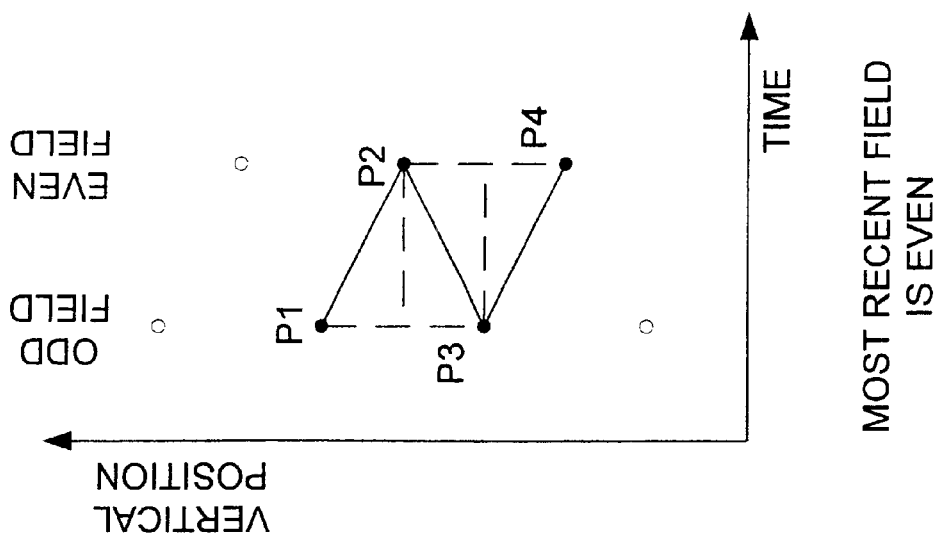

FIG. 10 shows how the spatio-temporal relationship between the contributing pixels of the preferred embodiment of commonly owned copending patent application Ser. No. 09/734,745 should preferably be chosen depending on whether the most recent field is even or odd. Essentially, the pixels are chosen such that for a static image, the same image samples are always used. Thus, if P1 represents a sample from an odd field, then P1 is always taken from an odd field, regardless of whether the most recent field is odd or even. This choice of pixel positioning prevents the measured motion value from alternating from one field to the next depending on whether the most recent field is even or odd, despite the fact there may be no actual motion at all within the image.

Figure 11B:
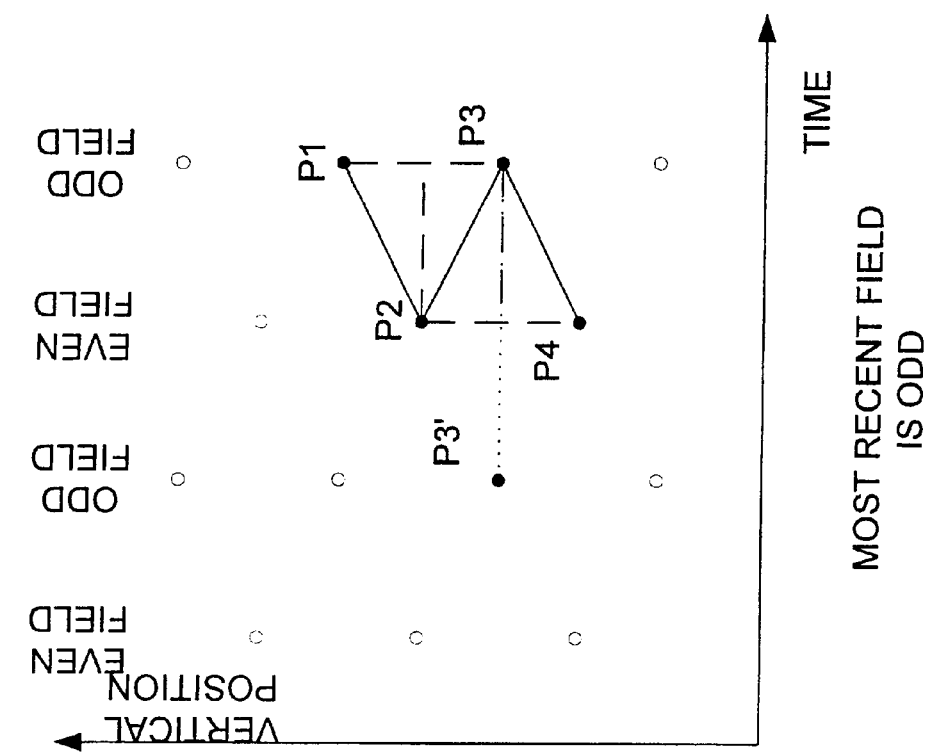
FIG. 11 is a schematic representation showing selection of contributing pixels for a preferred spatio-temporal relationship depending on whether the most recent field is even or odd, according to the preferred embodiment of the present invention.
Figure 11A:
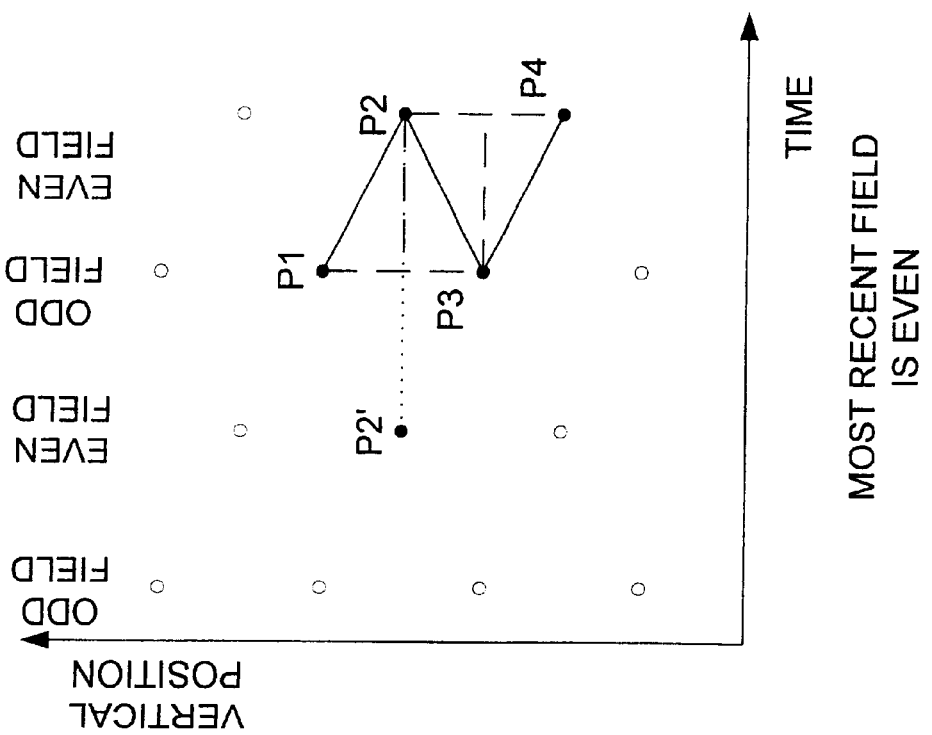

FIG. 11 shows the corresponding spatio-temporal relationship between the contributing pixels of the preferred embodiment of the present invention. This implementation preserves the beneficial aspects of the above-discussed copending patent application, namely, it is guaranteed not to produce false motion when no motion exists between two adjacent fields of opposite polarity and the vertical frequency is equal to or less than one half the vertical frame Nyquist frequency, as well as the benefits of the current invention, namely, it is guaranteed not to produce false motion when no motion exists between two successive fields of like polarity.

When the current field is odd, as in the case of the right side of FIG. 11, pixels P3 and P3' are used instead of pixels P2 and P2' in order for the motion value between the two successive odd fields to use pixels that most closely approximate the vertical mean position of the pixels contributing to the motion value between successive fields of opposite parity.

Figure 12:
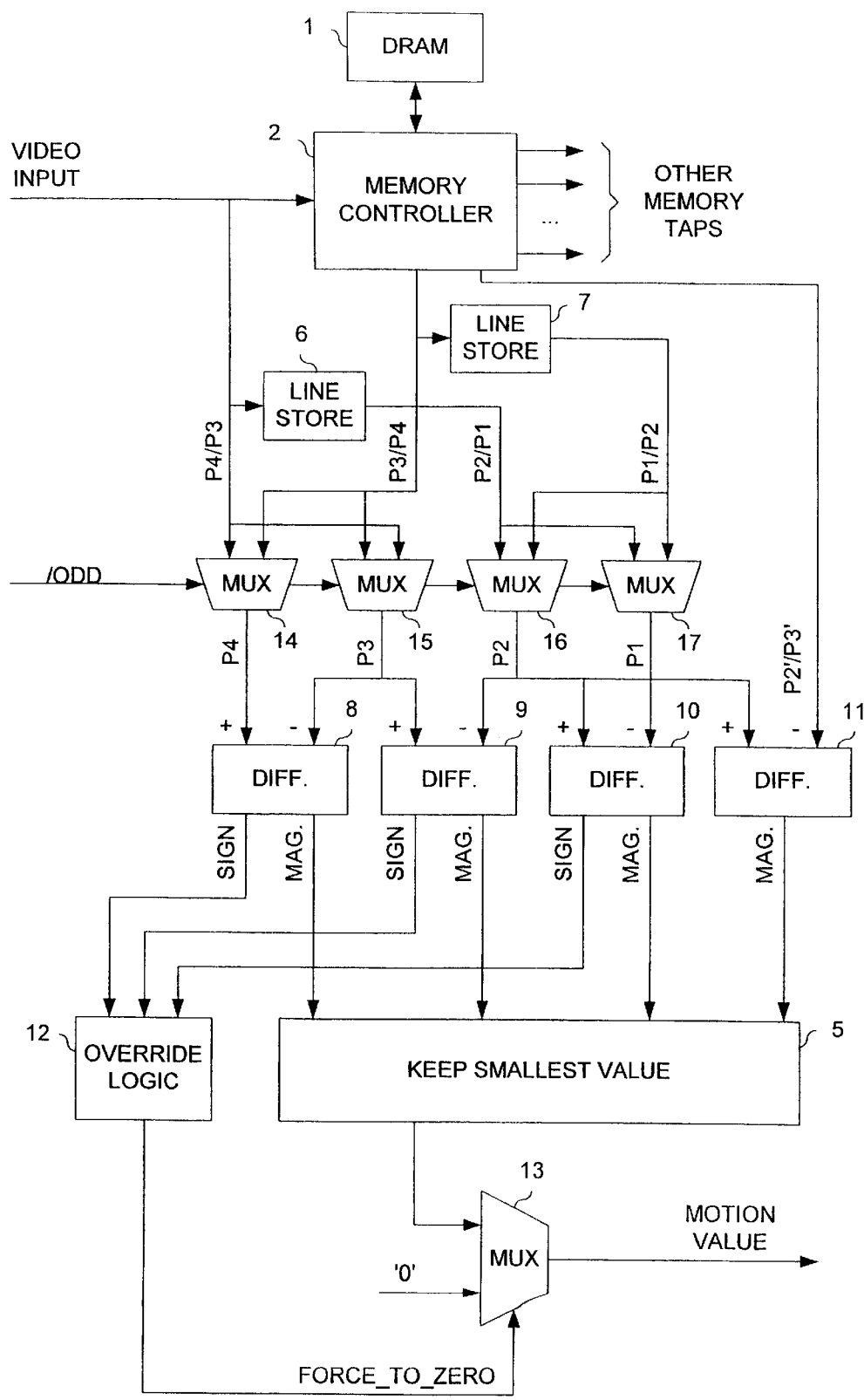
FIG. 12 is a block diagram of an apparatus for implementing the method according to the preferred embodiment of FIG. 11.

FIG. 12 shows an apparatus for implementing the method of the present invention as shown in FIG. 11. For convenience, the same numbers have been used to designate those items that are in common with the apparatus shown in FIG. 9. The refinement of appropriately selecting the pixels so as to avoid modulation of the motion signal from one field to the next is achieved by the addition of four multiplexors 14–17 and through manipulation of the delay provided by the memory controller 2. It will be apparent that the spatio-temporal relationship between the contributing pixels for the case in which the most recent field is odd as shown in the right side of FIG. 11, can be obtained by delaying the even field by one less line and by subsequently interchanging pixel P1 with P2 and pixel P3 with P4. In the apparatus of FIG. 12, multiplexors 14 and 15 are used to interchange pixels P3 and P4, while multiplexors 16 and 17 are used to interchange pixels P1 and P2, for the case when the field that is currently being inputted is odd. The memory controller 2 outputs P2' to the second input of differencing circuit 11 when the current field is even, and P3' when the current field is odd, to maintain the spatio-temporal relationship between the contributing pixels shown in FIG. 11.

A person understanding the present invention may conceive of other embodiments and variations thereof without departing from the sphere and scope of the invention as defined by the claims appended hereto.

I claim:

1. A method for measuring motion at a horizontal and vertical position between video fields of opposite parity comprising the steps of:

receiving pixels from a first video field of one parity, a second field of the opposite parity and a third field of said one parity;

measuring the signal value of at least one pixel from said first video field and at least one pixel from said second video field;

measuring the signal value of at least one additional pixel from said third video field, wherein said additional pixel is at an identical horizontal and vertical position to said at least one pixel from said first video field;

comparing the signal values of said at least one pixel from said first video field and said at least one pixel from said second video field and generating a measure of the motion between said first and second video fields;

comparing the signal values of said at least one pixel from said first video field and said at least one additional pixel from said third video field and generating a measure of the motion between the first and third video fields; and outputting a motion value equal to the lesser of said measure of the motion between the first and second video fields, and said measure of the motion between the first and third video fields.

2. The method of claim 1 wherein said pixels from said first and said second video fields are measured from the same vertical positions in fields of like parity, irrespective of the order in which the fields were received.

3. The method of claim 1 wherein said first video field immediately follows in time said second video field, and said second video field immediately follows in time said third video field.

4. The method of claim 1 wherein motion values produced from each of a plurality of sets of pixels are summed substantially over an entire field to produce an overall measure of the motion between said fields of opposite parity.

5. Apparatus for measuring motion at a horizontal and vertical position between video fields of opposite parity comprising:

a memory controller for receiving pixels from a first video field of one parity, a second field of the opposite parity and a third field of said one parity, each of said pixels being characterized by a signal value;

registers for receiving and storing at least one pixel from said first video field, at least one pixel from said second video field, and at least one additional pixel from said third video field, wherein said additional pixel is at an identical horizontal and vertical position to said at least one pixel from said first video field; and differencing circuitry for (i) comparing the signal values of said at least one pixel from said first video field and said at least one pixel from said second video field and generating a measure of the motion between said first and second video fields, (ii) comparing the signal values of said at least one pixel from said first video field and said at least one additional pixel from said third video field and generating a measure of the motion between the first and third video fields, and (iii) outputting a motion value equal to the lesser of said measure of the motion between the first and second video fields, and said measure of the motion between the first and third video fields.

* * * * *